United States Patent [19]

Breyer et al.

[11] Patent Number: 5,333,386

[45] Date of Patent: Aug. 2, 1994

[54] METHOD OF MEASURING THE EFFECTIVE INSTANTANEOUS POSITION OF A SLIDE-MOUNTED PROBE ELEMENT OR TOOL

[75] Inventors: Karl-Hermann Breyer, Heidenheim; Eugen Aubele; Günter Grupp, both of Bohmenkirch; Peter Ebersbach, Essingen; Wolfgang Wiedmann, Aalen, all of Fed. Rep. of Germany

[73] Assignee: Carl-Zeiss-Stiftung Heidenheim/Brenz, Oberkochen, Fed. Rep. of Germany

[21] Appl. No.: 957,398

[22] Filed: Oct. 6, 1992

[30] Foreign Application Priority Data

Oct. 17, 1991 [DE] Fed. Rep. of Germany ....... 4134371

[51] Int. Cl.$^5$ .............................................. G01B 7/03
[52] U.S. Cl. .................................. 33/1 M; 33/503
[58] Field of Search ................. 33/1 M, 503, 504, 556, 33/559

[56] References Cited

U.S. PATENT DOCUMENTS

| 4,523,380 | 6/1985 | Wright | 33/1 M |
| 4,597,182 | 7/1986 | Rinn | 33/503 |
| 4,882,848 | 11/1989 | Breyer et al. | 33/559 |
| 4,908,951 | 3/1990 | Gurny | 33/504 |
| 5,189,805 | 3/1993 | Matsumoto et al. | 33/1 M |

FOREIGN PATENT DOCUMENTS

| 0309094 | 3/1989 | European Pat. Off. . |
| 2950926 | 7/1980 | France . |
| 1364768 | 8/1974 | United Kingdom . |
| 2159941 | 12/1985 | United Kingdom . |

Primary Examiner—Christopher W. Fulton
Attorney, Agent, or Firm—Hopgood, Calimafde, Kalil & Judlowe

[57] ABSTRACT

A computer-operated coordinate-measurement machine has two length-measurement systems arranged in parallel for measuring the longitudinal displacement of a probe carried by the portal (3–5) of the machine, and these two length-measurement systems (13, 14) may belong to different precision classes. A computer-associated device (16) forms an absolute position-measurement value (Ym) from length-measurement signals of the more precise measurement system (13) and said device forms a dynamic measurement or instantaneous deviation value (Ys-Ym) from the difference between length-measurement signals of the respective systems (13, 14). The computer of the machine calculates the effective instantaneous position (Ym+Δy) of the probe (9a, b, c) borne by the portal (3–5), using the instantaneous value of the transverse position of the probe on the portal, in conjunction with the absolute measurement value (Ym) and the dynamic measurement value (Ys-Ym).

21 Claims, 5 Drawing Sheets

METHOD OF MEASURING THE EFFECTIVE INSTANTANEOUS POSITION OF A SLIDE-MOUNTED PROBE ELEMENT OR TOOL

BACKGROUND OF THE INVENTION

In coordinate-measuring machines of the portal type, drive mechanism for displacing the portal along a rectilineal guide is usually operative at the base of one of the two columns of the portal. In such machines, a problem often arises, in that, due to a change of drive speed, be it an acceleration or a deceleration, the portal is transiently displaced obliquely, or it oscillates about the vertical, due to dynamically acting inertial forces. Although the amplitude of these movements is relatively small, erroneous measurements can occur because the position of a probe element carried by the portal is then not accurately determined, since the position of the portal is, as a rule, determined by transmitters in the driven column of the portal, and these transmitters scan a scale along the guide.

In order to solve this problem, it has already been proposed in German Auslegeschrift 2,248,194 (corresponding to UK Patent 1,364,768) to arrange two parallel longitudinal scales, along opposite sides of the portal of a machine in which a carriage is transversely guided on the portal. By means of the two spaced measurement values thus obtained, the extent of oscillatory motion of the portal can be noted, and the exact position of the scanning element can be calculated, with due consideration of the instantaneous position of the transversely guided carriage.

This known solution has several disadvantages. Since the respective positions of the two portal columns are determined simultaneously as absolute values, two equivalent, highly accurate measurement systems are necessary on the two sides of the portal; and each of these systems must be connected to a stable reference point. If incremental-length measurement systems are used, it is further necessary to provide reference marks for the aforementioned reference point on both scales, so that the measurement systems can always be reinitialized.

Furthermore, temperature gradients can occur within the machine, and the influence of temperature on the two scales is not the same. Thus, as compared with measurement via a single scale, twice the number of temperature sensors are needed to read the scales, and mathematical correction of the influence of the temperature becomes very complicated.

BRIEF STATEMENT OF THE INVENTION

The object of the present invention is to eliminate, in a machine of the character indicated, the influence of above-noted oscillatory motion on the measurement of instantaneous position of a probe element, and to do so with the least possible expense for apparatus or for measurement.

It is clear that the problems described above can arise not only in the case of coordinate-measuring machines but also in machine tools, where the concern is with the instantaneous position of a tool positioned by the machine. Thus, the invention can also be used for purposes other than coordinate measurement.

The invention achieves the above object in a machine of the character indicated by providing, for a given coordinate direction of tool or probe-positioning displacement, two transversely spaced rectilineal displacement-measuring systems wherein the two systems are of different classes of precision. The guided structure which carries the tool or probe uses these two systems; specifically, absolute instantaneous position of the guided structure is ascertained by reliance on the more precise one of the two measuring systems, along one side of the guided structure, while dynamic deviation from the precise-system measurement relies upon the less-precise system, along the opposite side of the guided structure. The outputs of the two systems are so combined that inertial structure-oscillation errors arising in the course of acceleration or deceleration are effectively neutralized. In the preferred embodiment, the indicated corrective action is handled in a computer associated with the machine.

Since the second displacement-measuring system is used only for dynamic correction, there is no need for this second system to be so precise as to make absolute position measurements. A simpler measurement system may therefore be used against the scale on one side of the displaceable machine structure, while the high-grade measuring system is required only for the other side of the displaceable structure.

Thus, for example, a temperature-invariant Zerodur scale or a laser interferometer of precisely stabilized wavelength can be used as the length-measurement system of the higher-precision class on the one side of the movable structure, along with associated means to compensate for environmental parameters such as air pressure and temperature, at the wavelength used over the region of the measurement path.

On the other hand, the second length-measurement system can, for example, be a simple glass scale or a diode-laser interferometer, with simple wavelength stabilization and without environmental compensation. This is possible because long-term stability in the micrometer range is not necessary for reference points of either of the length-measurement systems, and the relating of both length-measurement systems to a common reference point is also not necessary.

DETAILED DESCRIPTION OF THE INVENTION

A preferred embodiment of the invention will be described in detail, in conjunction with the accompanying drawings, in which:

FIG. 3b is a similar graph to show the oscillatory motion $\Delta Y(t)$ of one with respect to the other of the sides of the portal of the machine of FIG. 1, to the same time scale as in FIG. 3a;

Figure 1:
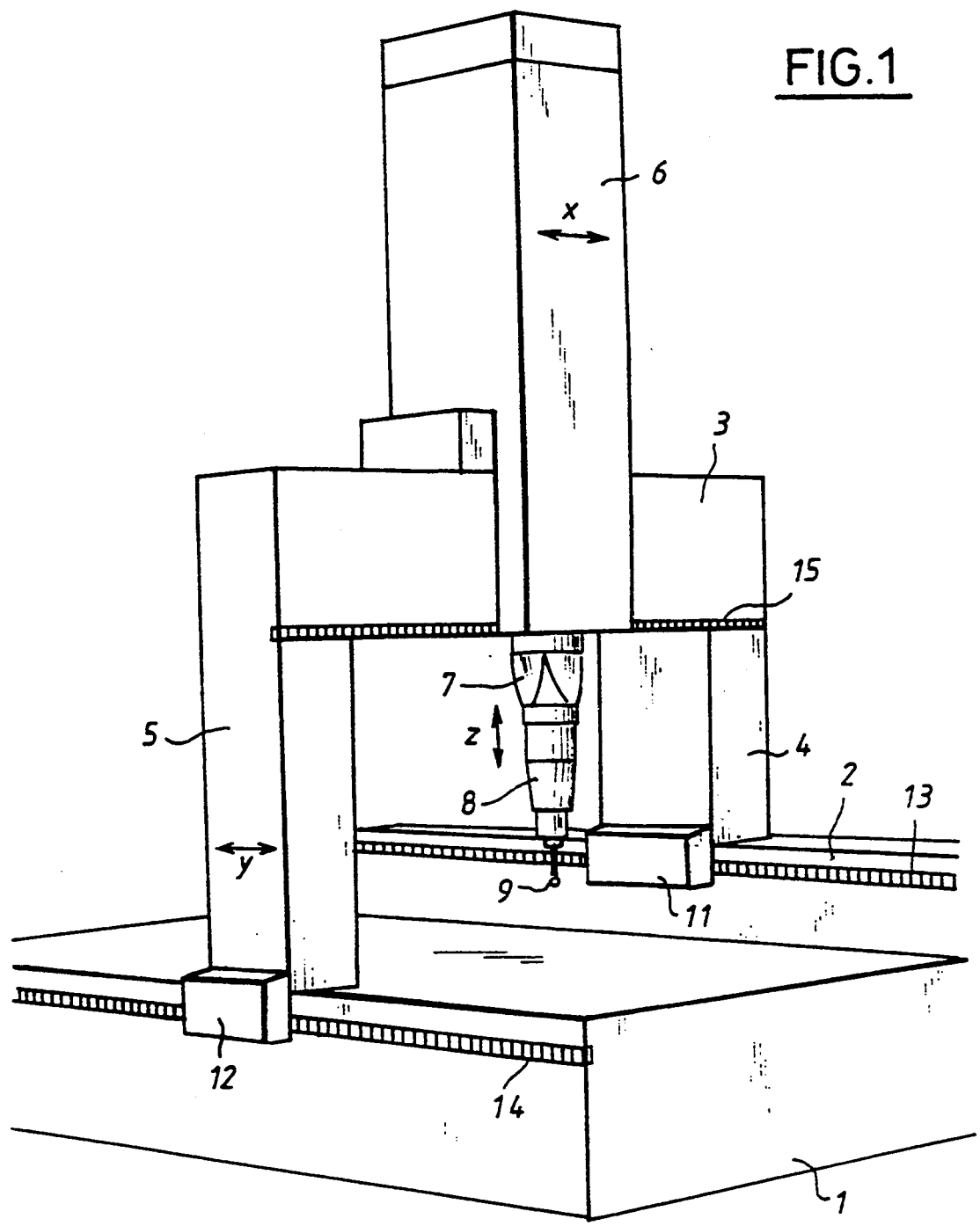
FIG. 1 is a simplified perspective view of a coordinate-measuring machine of the portal type, incorporating length-measurement systems of the invention.

The coordinate-measuring machine of FIG. 1 has a measurement table 1, illustratively of granite, along one side of which there is a guide 2 for a portal which is displaceable in the direction of the arrow marked Y. The portal comprises two columns 4, 5 and an elevated transverse girder or bridge 3 which rigidly connects the upper ends of the columns. A carriage or cross-slide 6 is displaceable along a transverse guide on bridge 3, the displacement of carriage 6 being in the direction of the arrow X, i.e., perpendicular to the Y-direction of portal guidance. The transverse carriage or cross-slide 6 contains guides for a spindle sleeve 7 which is displaceable vertically, in the Z-direction, and carries the probe head 8 of the coordinate-measuring machine, together with probe means 9 mounted thereto.

The portal of the coordinate-measuring machine will be understood to be driven by means carried at the base of one of its columns, namely, column 4 in FIG. 1; the double arrow y on column 4 will be understood to suggest such drive means in the Y-direction. The base of column 4 will also be understood to carry a photoelectric reading head 11 which scans a first, highly accurate temperature-invariant Zerodur scale 13 arranged parallel to the guide 2.

The scale 13 and the reading head 11 are ordinarily arranged within a housing (not shown) for the guide 2, for protection from dirt and dust, as by suitable folding bellows, etc. (not shown).

The base of the second portal column 5 carries another photoelectric reading head 12 which scans a second incremental scale 14, also arranged along the Y-direction of displacement. The scale 14 may be a simple glass scale without temperature sensors, since it is immaterial to the invention whether scale 14 changes its length as a function of temperature or temperature gradients. As compared with the temperature-invariant scale 13, scale 14 is therefore definitely of a class differing from scale 13, and scale 14 need not be constant over its length.

FIG. 1 also shows a transverse-displacement-measuring scale 15 along bridge 3 for use in measuring the instantaneous transverse position of carriage 6.

Figure 2:
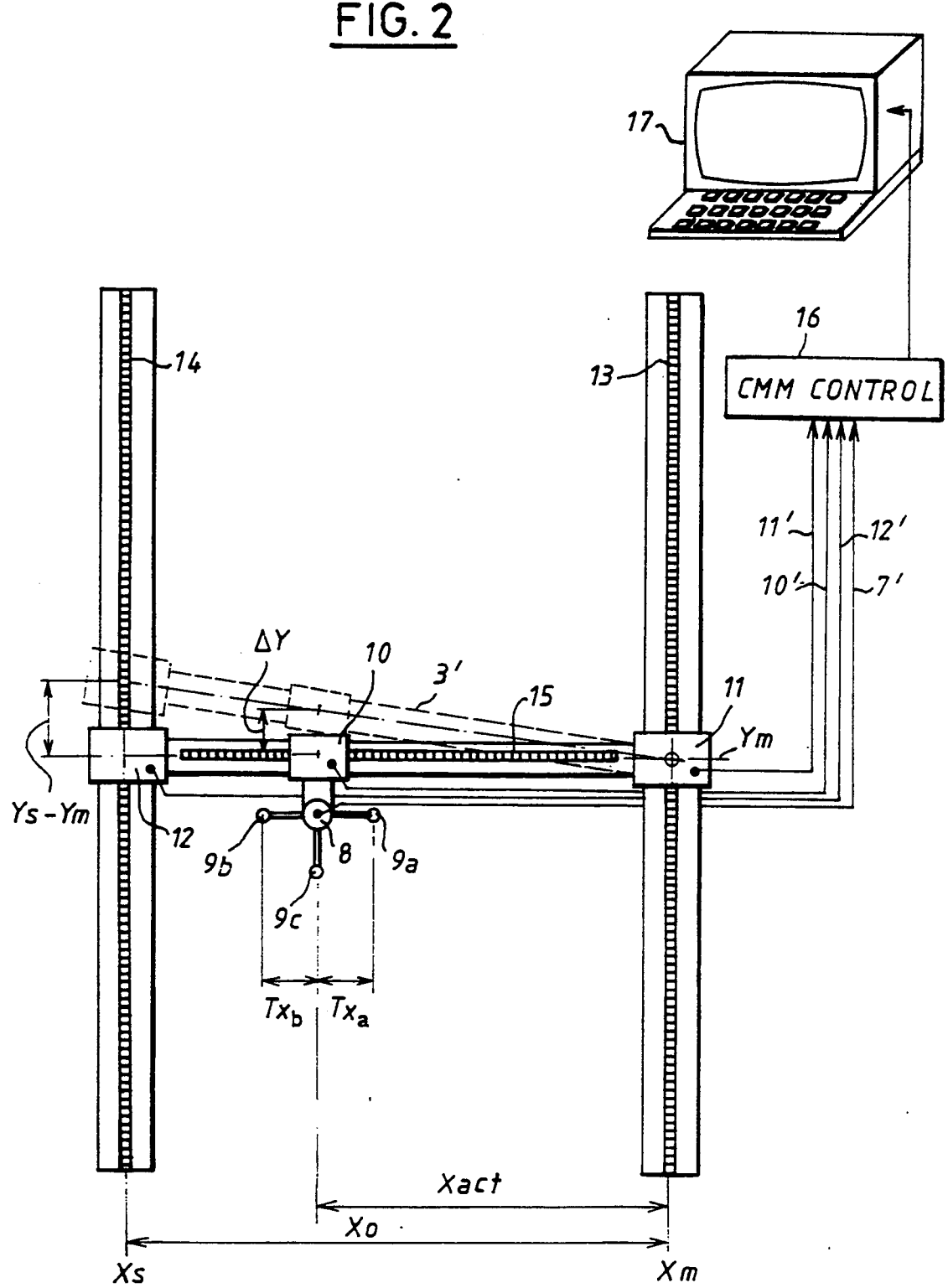
FIG. 2 is a diagrammatic view of the scales of the coordinate-measuring machine of FIG. 1, serving to explain geometric relationships.

The diagram of FIG. 2 schematically shows the photoelectric transmitter systems 11, 12 by which the scales 13, 14 are scanned, as well as the transmitter system 10 which scans the X-scale 15; these transmitter systems provide independent signal outputs 10', 11', 12' to control means 16 for the coordinate-measuring machine, and a fourth independent signal-output connection 7' will be understood to serve the Z-scale reading system (not shown) for measuring the instantaneous position of spindle 7, including the head 8 and probe means mounted thereto. The control means 16 for the machine receives its control commands from the computer 17 of the coordinate-measuring machine; control means 16 also transmits to the computer 17 the respective position-measurement values obtained from the signal outputs of the respective reading heads. The probe head 8 of the coordinate-measuring machine is also connected to control means 16; in this connection, the probe head 8 reports by suitable sensors the contacts of one or more probe elements 9a–c with a given workpiece to be measured.

Ordinarily, when the portal is driven for rapid displacement of the probe head 8, in approach to the workpiece to be measured, the drive is braked, to decelerate from high speed to a well-defined, constant, reduced speed for a work-contacting procedure. During this process, the portal can enter into oscillation about the vertical, as indicated in exaggerated fashion by dashed lines 3'. The amplitude of these oscillations is of course very small; it lies within the region of a few $\mu$m, but it can undermine and reduce the accuracy of measurement, since the position of the work-contacting element cannot be directly known from scale 13 as long as there is such oscillation.

In order to eliminate this uncertainty of measurement, it is a feature of the invention to employ the following procedure:

The position of the portal is continuously measured in absolute value with the highly precise scale 13 of Zerodur, along the right-hand side of FIG. 2. The corresponding measurement values are recorded with the machine cycle and briefly stored in intermediate storage within the machine-control means 16.

At the same time, at the left-hand side of FIG. 2, the less-precise scale 14 is read, for only a relatively short period of time, commencing at a time ($t_o$) about 1 second before the instant at which one of the probe elements (9a–c) contacts the workpiece, thereby producing the so-called contact or touch pulse. However, the starting value of position measurement (Ys) with scale 14 is replaced by the position value (Ym) determined by the precision scale 13 and thereafter, i.e., during the period of time before the work-contacting procedure, only the differences (Ys-Ym) between these two measurement values are read in the machine cycle. Viewed over time from the time ($t_o$) when the difference measurement values have been first read or formed, and up to the time ($t_a$) of workpiece contact, these differences in measurement value (Ys-Ym) of the two scales exhibit a function such as shown in simplified manner in FIG. 3a. The instant of time of initial workpiece contact may be available from a touch-trigger probe system as described in U.S. Pat. No. 4,177,568.

Figure 3A:
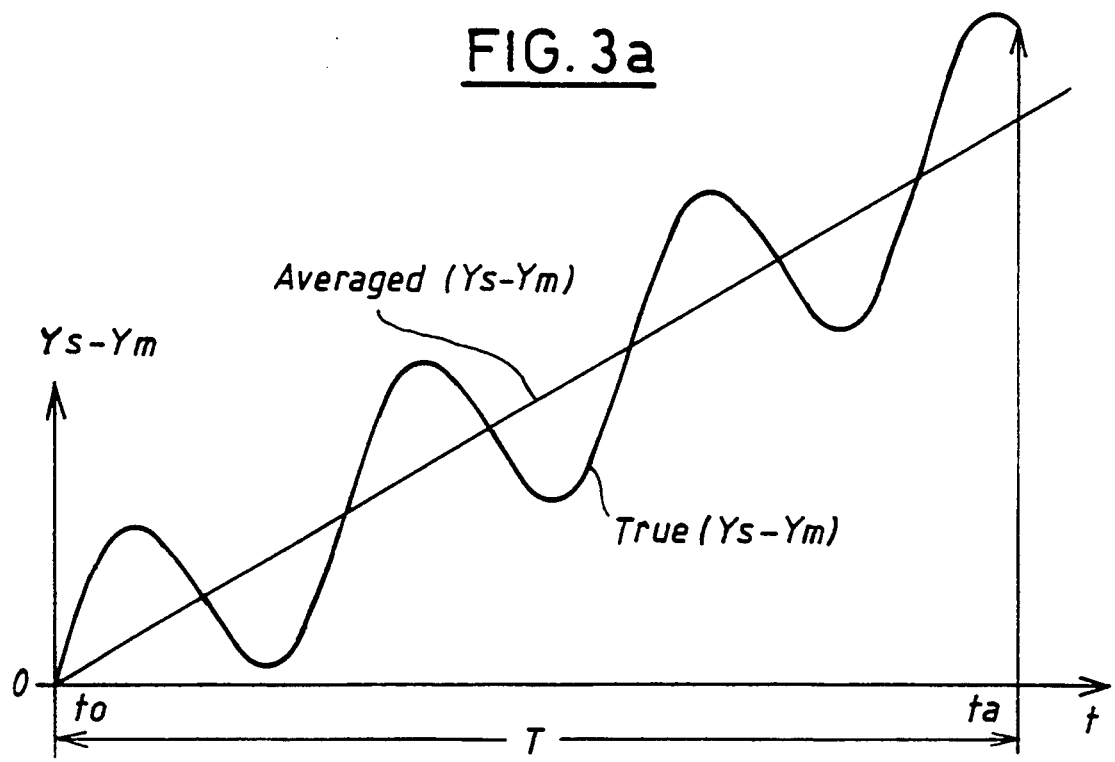
FIG. 3a is a graph to show a typical time function for the difference-measurement value (Ys-Ym), measured with the two scales 13, 14 of FIGS. 1 and 2.

In FIG. 3a, as a simplified first approximation, a rising straight line, labeled "Averaged (Ys-Ym)", will be understood to be attributable to slight differences in scale factors, as for example, lack of parallelism of the scales 13, 14; and portal oscillation about the vertical is superposed on this rising straight line, i.e., as an oscillating modulation about the straight line. The slope of this straight line is of course exaggerated in FIG. 3a; it will be understood that this slope will have been determined by the computer, during an interval of transient storage of (Ys-Ym) values, (a) after termination of the period T and (b) pursuant to an averaging algorithm.

Figure 3B:
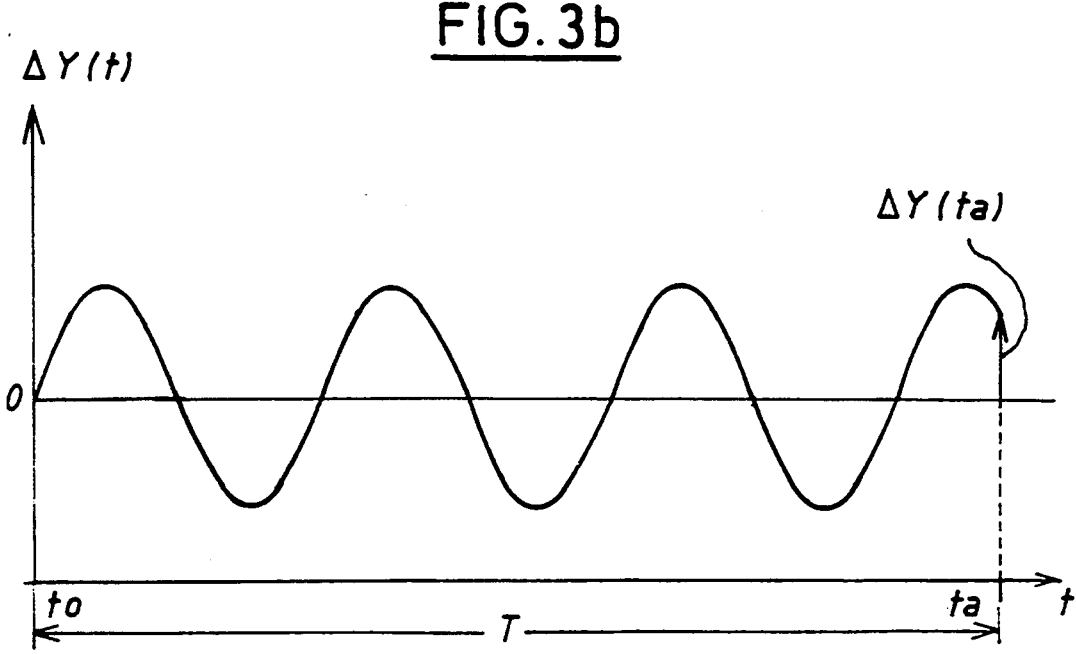

The slope of this straight line can be effectively reduced to zero by a suitable calculation, as for example by storing the function of the difference-measurement values (Ys-Ym) to derive a straight-line approximation thereof, and by then subtracting the slope of the derived line, from the measured difference values (Ys-Ym). The measured values Y(t) corrected in this manner then have the function shown in FIG. 3b, wherein the arrow designated $\Delta Y(t_a)$ represents the dynamic deviation by which the left column 5 of the portal has shifted with respect to the right column 4, at the instant of work contact.

However, this value $\Delta(t_a)$ is not identical to the correction value $\Delta Y$ by which head 8 or its probe element 9 have, at the instant of workpiece contact, shifted from the coordinate position to be measured with scale 13. The amount of this displacement $\Delta Y$ depends on the instantaneous X-position of the cross-slide or carriage 6 transverse to the longitudinal direction of portal travel.

The instantaneous position of the probe element 9a, in the Y-direction and at the instant of workpiece contact is illustratively determined in accordance with the equation:

$$\Delta Y9a = \left[ \frac{Xact + TXa}{X0} \right] \Delta Y(ta) \quad (1)$$

In this equation, which is readily derived from involved geometric relationships, $X_o$ is the distance between the two scales 13, 14, the positions of which are designated Xm and Xs, respectively; Xact is the instantaneously measured X-position of the probe head 8, and Txa is the instantaneously measured X-offset coordinate for the probe element 9a, referred to the X-position of the probe head, while $\Delta Y_{ta}$ is the instantaneously measured increment or decrement by which portal column 5 leads or follows the instantaneously measured position of column 4. It will be understood that in Equation (1), the value of X-offset (Tx) from the spindle axis will be either a positive or a negative value, depending on the direction of such offset; thus, as shown, Txa is a negative quantity.

The exact measurement value of the Y-position for the probe element 9a, at the instant of workpiece contact, is calculated by the computer 17 pursuant to Equation (1), using the two measurement values, namely, the absolute position value Ym measured with the precision scale 13 and the dynamic difference measurement value $\Delta Y(ta)$, as well as the measured X-position Xact, all of which values are taken at the same instant of workpiece contact.

It will thus be seen, as noted above, that to neutralize measurement error attributable to any portal oscillation about the vertical, it is not necessary that the left-hand scale 14 be related via any reference point to the right-hand (precision) scale; it is further seen that scale factor and temperature-dependence are unimportant to scale 14. Neither of these two points is involved in achieving the precision which is accomplished by the described method and means.

The invention has thus far been illustratively described in connection with a "touch-trigger" system, meaning that the instant of workpiece contact is the basic point of coordinate measurement, from which correction is calculated and made prior to entry into storage. However, the invention also has application to coordinate-measuring systems which use so-called measuring probe heads (sometimes referred to as proportional or analog probes), as disclosed and discussed in U.S. Pat. No. 4,882,848, which patent discloses a probe-head system which can be selectively operated in either the touch-trigger mode or the measuring mode. In such measuring-type systems, direction-sensitive and position-sensitive signal transmitters are so integrated with position-control circuitry that, commencing with the instant of initial probe-tip contact with the object being measured, (1) probe-head repositioning data accumulate for probe deflection after initial workpiece contact, and (2) upon attaining a predetermined probe deflection (or a predetermined time after initial workpiece contact), the measurement is deemed to have been validated and is automatically entered into the computer of the coordinate-measuring machine. For example, in the device of said U.S. Pat. No. 4,882,848, probe displacement is measurable for each of three coordinate directions (x,y,z) via signals proportional to probe deflection in each of these coordinate directions; each displacement-measuring system has its own means of recognizing the zero position of its own system; and each displacement-measuring system has its own means to position the probe in the zero position of its own system. And it is possible to so develop the position-control circuitry that return-to-zero is dispensed with, and so that the computer combines the position signals with the coordinate signals of the coordinate-measuring machine. This permits continuous contacting of an object to be measured along a predetermined line, i.e., so-called "scanning". In this connection, the actual coordinates of the workpiece being measured are determined by computer at each of a succession of points along the scanning path.

When operating a coordinate-measuring machine with an analog probe in the scanning mode, the coordinates of the workpiece surfaces are not taken continuously but, rather, in point-to-point succession, pursuant to the repetition rate of the cycle of machine-operated point measurement. Thus, each such point corresponds to a single measurement in the touch-trigger mode. Therefore, when using the machine in the scanning mode, it is only necessary (for determining Y-coordinate values) that the difference value ($\Delta Y$) be noted for each of the points measured along the y-component of probe displacement; thus, for the hundreds of discrete points measured in a particular scanning-mode program, the noted difference value ($\Delta Y$) unique to each measured point is used to correct each measured y-coordinate value, pursuant to Equation (1). And, in the course of the succession of measured points in such a scanning operation, the instant of time at which each point measurement is taken directly corresponds with the time (ta) of initial probe contact with the workpiece in the touch-trigger mode. Stated in other words, in the course of a scanning mode involving n measurement points, there will be n different instants ($ta_1, ta_2 \ldots ta_n$) at which $\Delta Y$ is noted and used for measurement correction pursuant to Equation (1), the signal pulse to identify each such instant being supplied by the computer as programmed, rather than by the piezo-derived signal (ta) of a touch-trigger operation. That being the case, the drawings which illustrate touch-trigger use of the invention can also serve to support use of the invention at each measurement point in a scanning-mode procedure.

The description thus far has concerned itself with a relatively simple correction for probe displacement in the y-direction by reason of portal oscillation about a vertical axis, it being assumed, for example, that such oscillation is characterized by swings of constant amplitude, for column 5 with respect to column 4 in the course of a given direction of Y-axis displacement, up to the instant (ta') when the computer program calls for a point measurement of coordinates, with automatic correction, inter alia for measured probe deflection and for use of the dynamic difference value (Ys-Ym) in Equation (1).

However, even though the use of this simplified technique, per description in connection with FIGS. 2 and 3, and in connection with Equation (1), will clearly reduce the margin of error in a given measurement, a further reduction in uncertainty of the measurement can be obtained by adopting measures now to be described. These measures are separately discussed under subheadings: (a) weighted formation of mean values, (b) filtration of measured values and interpolation of contact time, and (c) influence of the Z-coordinate.

(a) Weighted Formation Of Mean Values

The foregoing description wherein an approximated straight line (FIG. 3a) is subtracted from the stored value of the difference value (Ys-Ym) between scale readings (at 13, 14), and wherein each storage is during a predetermined time window (T) during which a measurement time (ta) occurs (either in a touch-trigger or in a proportional-measuring mode), will be seen to yield a relatively simple mean-value determination which is not optimal if the portal oscillation is noticeably damped during the time window (T). Yet, the circumstance of damped portal oscillation is frequently the case, because these oscillations occur for only a short period of time, namely, upon the starting or the braking of portal drive, in the Y-direction of drive.

Figure 3C:
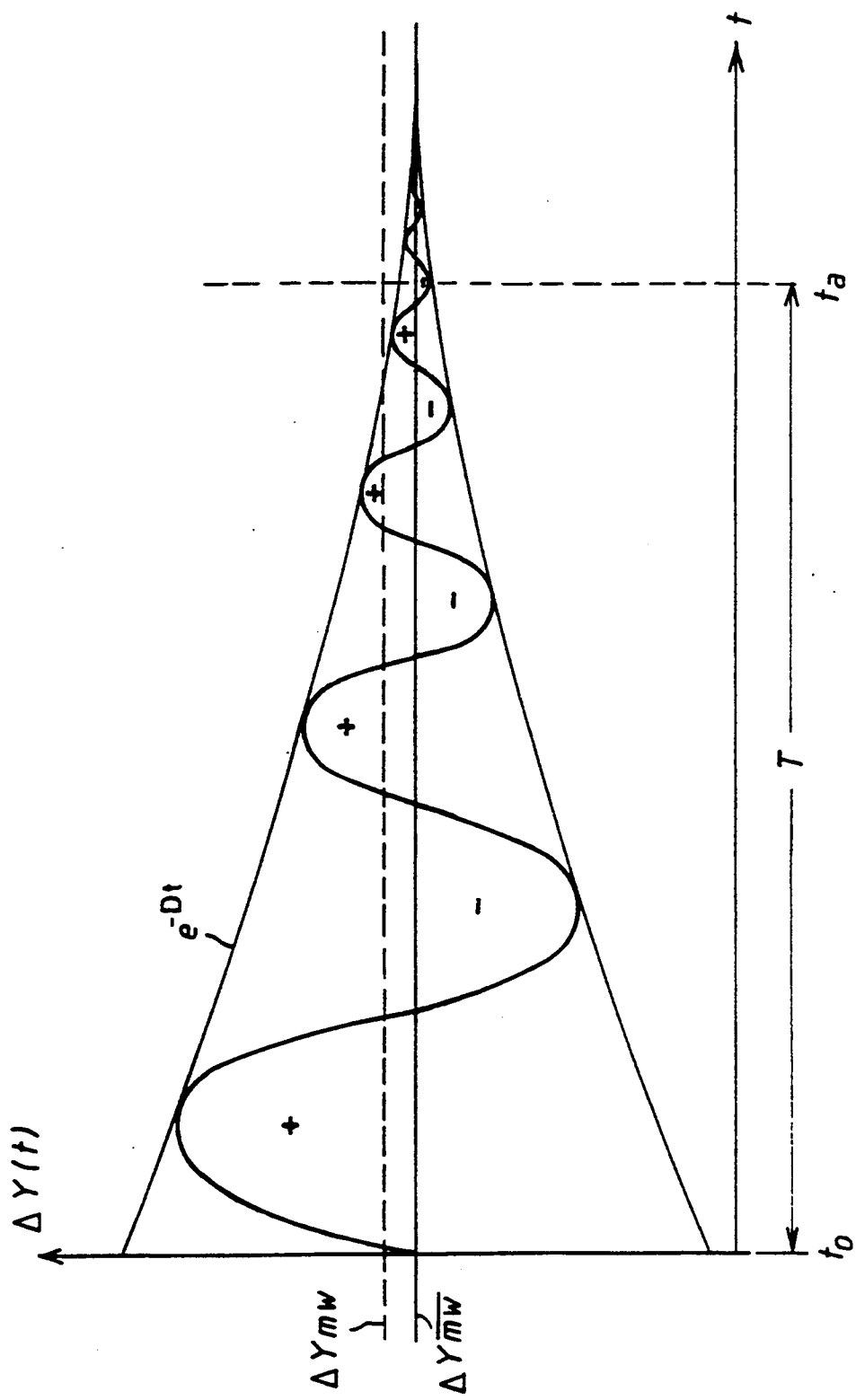
FIG. 3c is a diagram similar to FIG. 3b but in illustration of a more refined approach to solving the value $\Delta Y(t)$ at the instant ta.

FIG. 3c simplifies an explanation of the phase-dependence of the described straight-line subtraction technique, in the circumstance of damped portal oscillation, over the storage period (T), up to the instant (ta) of taking a point measurement. If, for example, one assumes a straight-line approximation of mean value $\Delta Ymw$ of the oscillations, and if one adopts as the criterion for the position of this straight-line approximation (of mean value $\Delta Ymw$) that the sum of the quadratic deviations between the measured differences (Ys-Ym) i−$\Delta Yi$ and the mean value $\Delta Yi$ is as small as possible, then the resulting mean-value determination $\Delta Ymw$ depends on the phase position of the oscillation or on the starting time (to) for the period (T) over which the measuring values and their differences $\Delta Yi$ are stored; for example, if the function $\Delta Y(t)$ commences with positive amplitudes, the mean value $\Delta Ymw$ will be shifted to larger values, i.e., the straight line will be shifted "upward", while if it commences with negative amplitudes, the mean value is shifted "downward". For this reason, the mean value scatters, depending on the random starting time (to) of the time window (T) for formation of the mean value, and this scattering can be noted in the result of the measurement.

Better results are obtained if, in the course of determining the mean value, the measured-value differences $\Delta Y(t)$ are weighted by a function which corresponds to the reciprocal of the decaying oscillation, thus weighting the decaying amplitudes to the same value as the amplitudes at the start of the formation of the mean value. For this so-called weighted mean-value formation, the condition is required that the sum of the squares of the differences between the measured value $\Delta Yi$ and the weighted mean value $\overline{\Delta Ymw}$, multiplied by the weighting function (Gi), are as small as possible. This condition is expressed in Equation (2):

$$\epsilon = \sum_i [(\Delta Yi - \overline{\Delta Ymw}) \cdot Gi]^2 = \text{Minimum} \quad (2)$$

At a minimum, we have $$\frac{\sigma\epsilon}{\sigma\overline{\Delta Ymw}} = 0 \quad (3)$$

from which $$\sum_i [2\Delta Yi \cdot Gi^2 - 2\overline{\Delta Ymw} \cdot Gi^2] = 0$$

and, from this, $$\sum_i \Delta Yi \cdot Gi^2 = \sum_i \overline{\Delta Ymw} \cdot Gi^2 \quad (4)$$

results. By transformation, one obtain from Equation (4), $$\overline{\Delta Ymw} = \frac{\sum_i \Delta Yi \cdot Gi^2}{\sum_i Gi^2} \quad (5)$$

where $Gi = e^{Dti}$, (6) and the parameter D describes the decay behavior of the damped oscillation.

The weighted mean value $\overline{\Delta Ymw}$ calculated in this manner scatters less by a factor of 5 than the simple mean value $\Delta Ymw$.

(b) Filtration Of The Measured Values And Interpolation To The Contact Time

Since portal oscillations are detected via the second measurement system (12, 14) at a portal-column location which is not identical to the location of probe-head mounting to the machine, the above-described weighted mean-value does not provide an entirely successful correction if the frequency spectrum of oscillations is different at these two locations.

Figure 4:
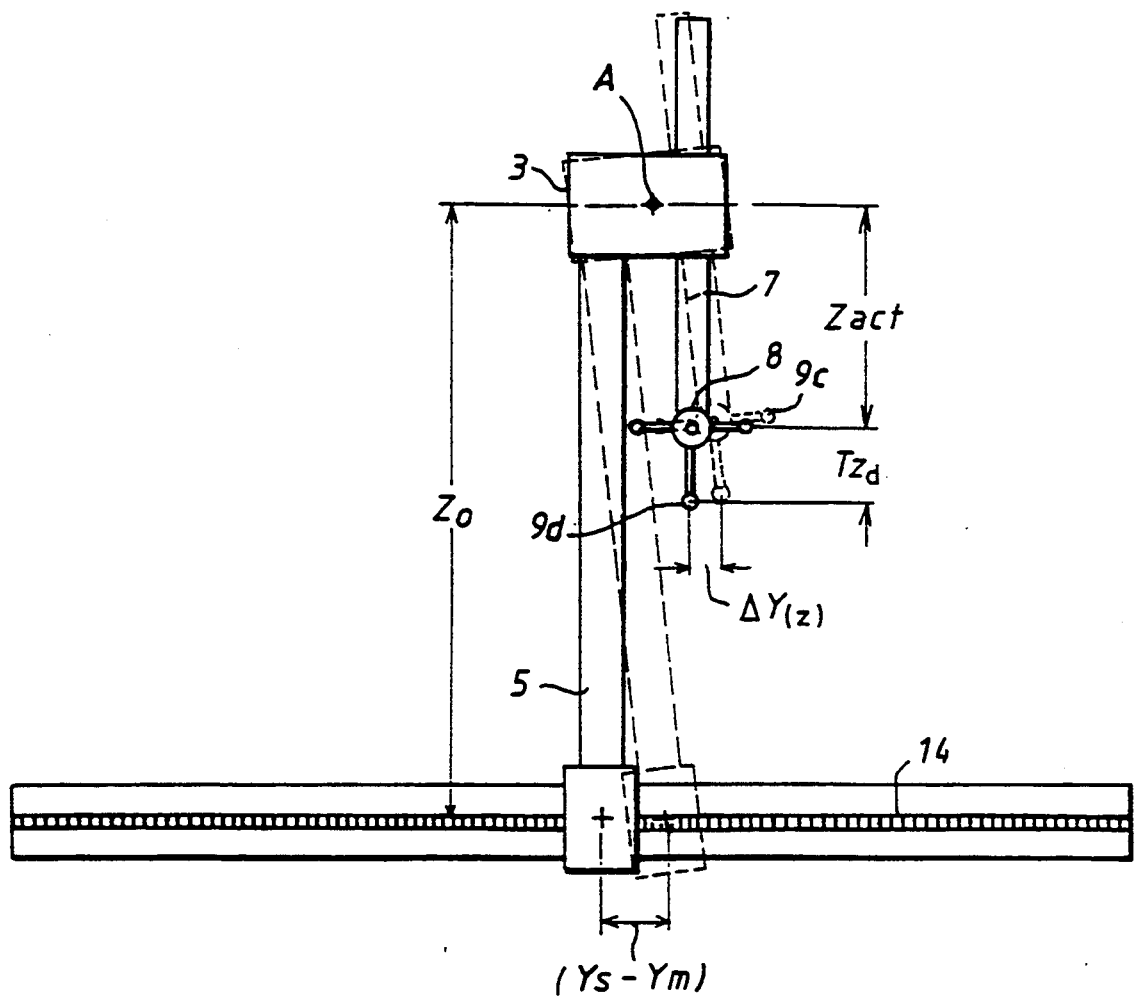
FIG. 4 is a simplified side view in elevation, for components of FIG. 2, but for display of another component of transient oscillatory displacement of the probe of FIG. 2.

FIG. 4 is a simplified showing of the relation of these two different mounting locations, as seen in side elevation, to show Z-axis relations affecting and therefore requiring correction of Y-coordinate measurements. It is noted that the spindle 7 can be more strongly damped via its guides and suspension from bridge 3 than is possible for the base of a portal column; as a consequence, the probe head 8 reacts with less sensitivity to higher frequencies than are detected at 12 against the dynamic measuring scale 14. To compensate for this effect, measured values (Ys) against scale 14 are stored before further processing and are so smoothed in a digital low-pass filtering process that the frequency spectrum at 12 corresponds approximately to that at the location of probe-head mounting to the machine. To correct for phase displacement in the low-pass filter, measured values (Ys) which were recorded and stored after the contact or point-measurement time (ta) are also included in the filtering process. By adjustment of filter parameters (cut-off frequency, slope, phase-shift), frequency variation of oscillations at the location of probe-head mounting can be adapted to those at the location 12 of the measurement system and thus corrected, even for different machines. The filter parameters can, for example, be determined by measuring the amplitude of oscillations in one frequency range with acceleration transducers on the probe head (8) and at the location of the measurement system (14) at the base of column (5) of the portal, and by then so adapting the parameters that the filter transforms the frequency spectrum at one location into the frequency spectrum at the other location.

It is important when making the correction to obtain the measured value (Ya) exactly at the contact or measurement time (ta), while digital filtering of the measured values is carried out in constant machine tempo; it is therefore necessary, in order to obtain the exact measured value, to interpolate to the time (ta). This is done in accordance with the following formula:

$$Y_{s(ta)}^F = Y_{si}^F + \frac{(Y_{s(ta)}^F - Y_{si}^F)(Y_{s(i+1)} - Y_{si})}{Y_{s(i+1)} - Y_{si}} \quad (7)$$

In Equation (7), the quantity (Ysi) is the unfiltered measured value at a machine-cycle time (t1) directly before the contact or measurement time (ta); Ys(i+1) is the unfiltered measured value at the machine-cycle time (i+1) directly after the contact or measurement time (ta); and the variables designated with the superscript F are the corresponding filtered measured values.

(c) Influence Of The Z-Coordinate

In the above analysis, it has been assumed that oscillations of the portal are primarily rotary oscillations about the vertical. However, it has been found that, in addition, other or secondary modes of oscillation occur; significant among these is a secondary mode of oscillation which is caused by torsion of the bridge 3 about its horizontal, transversely extending axis (A). This mode of oscillation has a different effect on the portal column 5 and the probe head 8, in that the amplitude of oscillation of the probe head 8 is dependent upon the position of the probe head 8 in the vertical or Z-direction of the portal. The geometric relationships involved in this torsional oscillation will be explained in connection with FIG. 4, wherein Zo is the vertical distance between the pivot point (A) of this second mode of oscillation and the position of scale 14, and Zact is the distance of the probe head 8 from the pivot point (A). These factors provide the following equation for correction of the Z-dependence of measured values:

$$Y9d(z) = \frac{(Z_{act} + T_{zd}) \Delta Y(ta)}{Z_o} \quad (8)$$

In this equation, (Tzd) is, for example, the coordinate in the Z-direction for the ball (9d) of a probe mounted to probe head 8, and Y(ta) is again the difference between respective measured values (Ys) and (Ym) of the two scales 14, 13.

Equation (8) has the same structure as Equation (1) for the calculation of the X-dependence of the correction value.

The relative magnitudes of the described two modes of oscillation will be seen to be not constant but a function of the actual phase delay between both oscillations. Therefore, for a complete correction factors (a) and (b) have to be determined in a correction formula:

$$Y(x, z) = a \cdot \Delta Y(x) + b \cdot \Delta Y(z) \quad (9)$$

for each contact time (ta). Determination of these factors is possible if the frequencies of both oscillations are different; then, the frequencies and thus the modes of oscillation can be separated by suitable filtering of the signal of transmitter 12.

(d) Correction Of The Influence Of The Acceleration

Another secondary factor of error which has not yet been discussed results from the fact that, due to the limited stiffness of the portal, and in the case of very short contact paths, the portal is still in the course of acceleration at the contact time (ta). Due to the limited stiffness of the portal, the second measurement system (14) and the probe head lag behind the driven portal column, and the mean value calculated from oscillations of the portal must be corrected by a variable which, in first approximation, is proportional to the mean acceleration (amw) during the time of formation of the mean value of the differences ΔYmw of the measured values (Ys) and (Ym). This is described by the following equation:

$$\Delta Ymw(a) = \Delta Ymw = K_a \cdot a_{mw} \quad (10)$$

wherein Ka is a value which is constant for the type of machine.

With the described corrections, it is possible to obtain for a coordinate-measuring instrument of light-weight construction a low uncertainty of measurement which has previously been achieved only by coordinate-measuring machines of extremely rigid structure or by drives imparted at the center of gravity of the portal. At this point, it should furthermore be emphasized that it is by no means necessary to simultaneously use all the described measures. Rather, the desirability of using one or more of these measures (a to d) will depend on the oscillation behavior of the specific coordinate-measuring machine; and use of one or more of these measures will also depend on the extent of the uncertainty of measurement which is to be permitted for the machine.

What is claimed is:

1. A method of measuring the effective instantaneous position of a probe element (9a, b, c, d) or tool borne by a moving carriage (portal 3, 4, 5), the carriage being provided with a first and more-precise length-measurement system and with a second and less-practice length-measurement system, which method comprises:

(a) using only the more-precise length-measurement system (13) for measuring absolute-position measurement values in the length-measuring direction;

(b) using the less-precise length-measurement system (13) for measuring absolute-position measurement values in the length-measuring direction;

(b) using the less-precise length-measurement system (14) only to determine dynamic deviation from the position determined by the more-precise length-measurement system (13), the use of this step (b) being only for a predetermined interval of time prior to and including an instant at which the effective instantaneous position of the probe element or tool is to be determined; and (c) correctively neutralizing error attributable to carriage oscillation, by relating the determined dynamic deviation at said instant to the position determined at said instant by the more-precise length-measuring system.

2. A method according to claim 1, in which said measurement systems are in spaced parallel relation.

3. A method of measuring the effective instantaneous position of a probe element (9a, b, c, d) or tool borne by a carriage (portal 3, 4, 5), the carriage being provided with a first and more precise length-measurement system (13) and with a second and less-precise measurement system (14), the absolute position measurement value of the carriage in the length-measuring direction being determined with the more precise length-measurement system (13) while dynamic deviation from the position determined by the more precise length-measurement system (13) is a measurement value determined with the less-precise length-measurement system (14), the two position-measurement values (Ys, Ym) being related to each other for corrective neutralizing of error attributable to oscillation of the carriage, both measuring systems (13, 14) being read in the same cadence, the differences [ΔYi−(Ys-Ym)i] of the two measurement values being stored in each case over a fixed time interval (T), and the linear part of the resultant function being subtracted from the measurement values.

4. A method according to claim 3, in which the differences [ΔYi=(Ys-Ym)i] of the two measurement values are formed and multiplied (weighted) with a function G(i) which characterizes the damping behavior of the oscillation of the carriage.

5. A method according to claim 3, in which the influence of the deformation of the carriage under the influence of acceleration forces is taken into account within the established time range (T) within which the measurement values (Ys, Ym) are stored.

6. A method of measuring the effective instantaneous position of a probe element (9a, b, c, d) or tool borne by a carriage (portal 3, 4, 5), the carriage being provided with a first and more precise length-measurement system (13) and with a second and less-precise measurement system (14), the absolute position measurement value of the carriage in the length-measuring direction being determined with the more precise length-measurement system (13) while dynamic deviation from the position determined by the more precise length-measurement system (13) is a measurement value determined with the less-precise length-measurement system (14), the two position-measurement values (Ys, Ym) being related to each other for corrective neutralizing of error attributable to oscillation of the carriage, the less precise measurement system (14) being read in each case, or its signals further processed, only within a fixed interval (T), commencing at a first instant (to) before a second instant (ta) when the exact position measurement value [Ym+Y(ta)] must be determined.

7. A method of measuring the effective instantaneous position of a probe element (9a, b, c, d) or tool borne by a carriage (portal 3, 4, 5), the carriage being provided with a first and more precise length-measurement system (13) and with a second and less-precise measurement system (14), the absolute position measurement value of the carriage in the length-measuring direction being determined with the more precise length-measurement system (13) while dynamic deviation from the position determined by the more precise length-measurement system (13) is a measurement value determined with the less-precise length-measurement system (14), the two position-measurement values (Ys, Ym) being related to each other for corrective neutralizing of error attributable to oscillation of the carriage, the position-measurement values (Ys) of the less-precise measurement system (14) being subjected to a filtering process which adapts the frequency spectrum of the oscillation of the carriage at the location of the less-precise measurement (14) to the frequency spectrum of the carriage at the location of the probe element (9).

8. A method of measuring the effective instantaneous position of a probe element (9a, b, c, d) or tool borne by a carriage (portal 3, 4, 5), the carriage being provided with a first and more precise length-measurement system (13) and with a second and less-precise measurement system (14), the absolute position measurement value of the carriage in the length-measuring direction being determined with the more precise length-measuring system (13) while dynamic deviation from the position determined by the more precise length-measurement system (13) is a measurement value determined with the less-precise length-measurement system (14), the two position-measurement values (Ys, Ym) being related to each other for corrective neutralizing of error attributable to oscillation of the carriage, the less-precise measurement system (14) being read in each case only within a fixed interval (T), commencing at a first instant before a second instant (ta) when the exact position-measurement value [Ym+ΔY(ta)] must be determined.

9. A method of measuring the effective instantaneous position of a probe element (9a, b, c, d) or tool borne by a carriage (portal 3, 4, 5), the carriage being provided with a first and more precise length-measurement system (13) and with a second and less-precise measurement system (14), the absolute position measurement value of the carriage in the length-measuring direction being determined with the more precise length-measurement system (13) while dynamic deviation from the position determined by the more precise length-measurement system (13) is a measurement value determined with the less-precise length-measurement system (14), the two position-measurement values (Ys, Ym) being related to each other for corrective neutralizing of error attributable to oscillation of the carriage, the less-precise measurement system (14) being read to produce signals in each case only within a fixed interval (T) and said signals being further processed only in said interval (T), commencing at a first instant (to) before a second instant (ta) when the exact position-measurement value must be determined.

10. A method of measuring the effective instantaneous position of a probe element (9a, b, c, d) or tool borne by a carriage (portal 3, 4, 5), the carriage being provided with a first and more precise length-measurement system (13) and with a second and less-precise measurement system (14), the absolute position measurement value of the carriage in the length-measuring direction being determined with the more precise length-measurement system (13) while dynamic deviation from the position determined by the more precise length-measurement system (13) is a measurement value determined with the less-precise length-measurement system (14), the two position-measurement values (Ys, Ym) being related to each other for corrective neutralizing of error attributable to oscillation of the carriage, both measurement systems (13, 14) being read in machine cadence, and position-measurement values (Ys) of the less-precise measurement system (14) being recorded in the machine cadence and interpolated to an instant (ta) at which the exact position-measurement value (Ym+ΔY(ta)) must be determined.

11. A method of measuring the effective instantaneous position of a probe element (9a, b, c, d) or tool borne by a carriage (portal 3, 4, 5), the carriage being provided with a first and more precise length-measurement system (13) and with a second and less-precise measurement system (14), the absolute position measurement value of the carriage in the length-measuring direction being determined with the more precise length-measurement system (13) while dynamic deviation from the position determined by the more precise length-measurement system (13) is a measurement value determined with the less-precise length-measurement system (14), the two position-measurement values (Ys, Ym) being related to each other for corrective neutralizing of error attributable to oscillation of the carriage, the position of the probe elements (9a, b, c) in both measurement directions (x and z) perpendicular to the direction of measurement of said two length-measurement systems being included in the calculation of the effective instantaneous position at an instant (ta) at which the exact position-measurement value (Ym+ΔY(ta)) must be determined.

12. A machine having two length-measurement systems (13, 14) arranged in parallel for measuring the displacement of one of its carriages (portal 3–5), one (13) of said systems being a more-precise measurement system and the other (14) of said systems being a less-precise measurement system, the two length-measurement systems (13, 14) being connected to a device (16) which forms an absolute position-measurement value (Ym) from the signals of the more-precise length-measurement system (13) and a dynamic-measurement value [ΔY—(Ys-Ym)], means connected for response to signals from the less-precise measurement system (14) to determine the dynamic measurement value which characterizes instantaneous deviation of the less-precise measurement system (14) from the position of the more-precise length-measurement system (13), and said machine having a computer which calculates, from the two measurement values, the effective instantaneous position (ΔYa1, ΔYd2) of a probe element (9a, b, c, d) or tool borne by the carriage (portal 3–5).

13. A machine according to claim 12, wherein the machine is a coordinate-measurement machine of the portal type, and wherein a probe is carried by a cross-slide on the portal of the machine.

14. A machine according to claim 13, in which both measurement systems are interferometers and only one of the two interferometers has a device for compensating for environmental parameters or for the highly precise stabilizing of the wavelength of the measurement light used.

15. A machine according to claim 12, in which the length-measurement systems contain scales (13, 14).

16. A machine according to claim 15, in which one of the two scales is a temperature-invariant Zerodur scale (13) and the other scale (14) consists of material with non-negligible thermal expansion.

17. A machine according to claim 12, in which said one and said other measurement systems belong to different precision classes.

18. A machine according to claim 12, in which one of the two measurement systems contains a scale and the other measurement system is an interferometric length-measurement system.

19. The method of measuring the true longitudinal position (Y) of a probe element mounted to the cross-slide of a computer-controlled portal-type coordinate-measuring machine, wherein longitudinal displacement of the portal is via drive to one to the exclusion of the other of the transversely spaced columns of the portal, which method comprises the steps of:

(a) providing a highly precise longitudinal scale and reading system alongside and coacting with one of the portal columns, and continuously measuring said scale for the instantaneous positional value ($Y_m$) of said one column;

(b) providing another longitudinal scale and reading system alongside and coacting with the other portal column, and continuously measuring said other scale for the instantaneous positional value ($Y_s$) of said other column;

(c) driving said one column in a workpiece-contacting program wherein the portal and its probe undergo speed change prior to the instant of workpiece contact, and generating an electrical trigger signal at the instant of workpiece contact;

(d) at a given sufficiency of time (to) prior to the instant (ta) of workpiece contact, applying the positional value (Ym) of the highly precise scale to the positional value (Ys) of the other scale such that the difference between these values (Ys-Ym) is a continuously produced value, and tracking this difference continuously to establish a deviation value ΔY reflecting time-varying deviation of instantaneous other-column position with respect to the instantaneous position of said one column;

(e) using said trigger signal to simultaneously enter into computer storage the instantaneously measured-position value (Ym) of said one column, and separately to enter into computer storage the instantaneous deviation value ΔY of the other-scale reading (Ys);

(f) ascertaining the instantaneous transverse position (Xact) of the probe in relation to the transverse spacing (Xo) of said scales, to establish a transverse proportionality factor;

(g) multiplying the stored deviation value ΔY(ta) by said transverse proportionality factor to develop the true instantaneous deviation of probe position with respect to measured-position value (Ym) of said one portal column; and (h) algebraically adding the true instantaneous deviation value of step (g) to the stored instantaneous measured-position value (Ym), and entering said algebraic addition into computer storage as the Y-component of probe position at the instant of workpiece contact.

20. The method of measuring the true longitudinal position (Y) of a displacement-measuring probe element mounted to the cross-slide of a computer-controlled portal-type coordinate-measuring machine, wherein longitudinal displacement of the portal is via drive to one to the exclusion of the other of the transversely spaced columns of the portal, which method comprises the steps of:

(a) providing a highly precise longitudinal scale and reading system alongside and coacting with one of the portal columns, and continuously measuring said scale for the instantaneous positional value (Ym) of said one column;

(b) providing another longitudinal scale and reading system alongside and coacting with the other portal column, and continuously measuring said other scale for the instantaneous positional value ($Y_s$) of said other column;

(c) driving said one column in a workpiece-contacting program wherein the portal and its probe undergo speed change prior to a predetermined instant (ta') of probe deflection at a predetermined point of workpiece contact;

(d) at a given sufficiency of time (to) prior to the instant (ta) of workpiece contact, applying the positional value (Ym) of the highly precise scale to the positional value (Ys) of the other scale such that the difference between these values (Ys-Ym) is a continuously produced value, and tracking this difference continuously to establish a deviation value ΔY reflecting time-varying deviation of instantaneous other-column position with respect to the instantaneous position of said one column;

(e) simultaneously and at said predetermined instant (ta') entering into computer storage the instantaneously measured-position value (Ym) of said one column, and separately entering into computer storage the instantaneous deviation value ΔY of the other-scale reading (Ys);

(f) ascertaining the instantaneous transverse position (Xact) of the probe in relation to the transverse spacing (Xo) of said scales, to establish a transverse proportionality factor;

(g) multiplying the stored deviation value Y(ta') by said transverse proportionality factor to develop the true instantaneous deviation of probe position with respect to measured-position value (Ym) of said one portal column; and (h) algebraically adding the true instantaneous deviation value of step (g) to the stored instantaneous measured-position value (Ym), and entering said algebraic addition into computer storage as the Y-component of probe position at the instant of workpiece contact.

21. In a coordinate-measuring machine of the portal type, having a base with longitudinal guide means for the respective columns, a transversely extending bridge rigidly connecting said columns, and a workpiece contactable probe carried by a cross-slide that is transversely positionable on said bridge, a computer associated with said machine and longitudinal drive means operated at varying speeds by said computer pursuant to a program of workpiece-contacting procedure, the improvement comprising:

(a) a highly precise longitudinal scale and reading system alongside and coacting with one of the portal columns, and means continuously measuring said scale for the instantaneous positional value (Ym) of said one column;

(b) a second longitudinal scale and reading system alongside and coacting with the other portal column, and means continuously measuring said other scale for the instantaneous positional value (Ys) of said other column;

(c) said drive means reducing the speed of longitudinal advance of said portal prior to the instant of probe contact with a workpiece, and means associated with the probe for generating an electrical trigger signal at the instant of workpiece contact;

(d) means associated with said computer and with the instantaneous reading values of the respective scales (i) for providing in response to said trigger pulse a first signal reflecting the difference between said reading values and for transiently storing the value of said difference at the time of said trigger purlse, and (ii) for separately and transiently storing the positional value (Ym) of said one column at the time of said trigger pulse;

(e) a transverse scale on said bridge and an associated reading head on said cross-slide for providing a transverse-position value for the probe at the instant of workpiece contact;

(f) means associated with said computer and establishing a transverse proportionality factor for said transverse-position value, in relation to the transverse spacing between said scales;

(g) means associated with said computer for multiplying the stored deviation value by said transverse proportionality factor to develop the true instantaneous deviation of probe position with respect to the stored instantaneous position value (Ym) for said one column, said true instantaneous deviation being algebraically added to the stored instantaneous position value (Ym), and the algebraic addition being entered into computer storage as the Y component of probe position at the instant of workpiece contact.

* * * * *